(12) United States Patent
Jia et al.

US011005696B1

(10) Patent No.: US 11,005,696 B1
(45) Date of Patent: May 11, 2021

(54) MODULATION SCHEME IN A WIRELESS COMMUNICATION SYSTEM

(71) Applicants: Ming Jia, Ottawa (CA); Jianglei Ma, Ottawa (CA)

(72) Inventors: Ming Jia, Ottawa (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/864,799

(22) Filed: May 1, 2020

(51) Int. Cl.
| | |
|---|---|
| *H04L 27/26* | (2006.01) |
| *H04B 1/715* | (2011.01) |
| *H04L 1/00* | (2006.01) |
| *H04L 25/03* | (2006.01) |
| *H04B 1/69* | (2011.01) |

(52) U.S. Cl.
CPC ......... *H04L 27/2636* (2013.01); *H04B 1/715* (2013.01); *H04L 1/0041* (2013.01); *H04L 25/03834* (2013.01); *H04L 27/265* (2013.01); *H04B 2001/6908* (2013.01); *H04B 2201/71307* (2013.01)

(58) Field of Classification Search
CPC ............... H04L 27/2636; H04L 1/0041; H04L 25/03834; H04L 27/265; H04B 1/715; H04B 2001/6908; H04B 2201/71307
See application file for complete search history.

(56) References Cited

U.S. PATENT DOCUMENTS

| | | | | |
|---|---|---|---|---|
| 2019/0053211 | A1* | 2/2019 | Ying | H04W 72/044 |
| 2019/0297489 | A1* | 9/2019 | Lei | H04L 5/0094 |

OTHER PUBLICATIONS

Q. Xiong, et al, "Advanced NoMA Scheme for 5G Network: Interleave-Grid Multiple Access", Proc. IEEE Globecom, Dec. 2017.
Y. Chen, et al, "SCMA: A Promising Non-Orthogonal Multiple Access Technology for 5G Networks", IEEE VTC-Fall, Sep. 2016.
Z. Yuan, "Multi-User Shared Access for Internet of Things", IEEE VTC Spring, Jul. 2016.
B. Wang, et al, "Comparison Study of Non-Orthogonal Multiple Access Schemes for 5G", Proc. IEEE BMSB, Jun. 2015.
R1-050702 DFT-Spread OFDM with Pulse Shaping Filter in Frequency Domain in Evolved UTRA Uplink, NTT DoCoMo, RAN WG1 #42, London, UK, Sep. 2005.

* cited by examiner

*Primary Examiner* — David S Huang

(57) ABSTRACT

A system and method of DFT-S-OFDM modulation is provided that uses a set of frequency domain patterns. For a given transmitter, for a set of DFT-S-OFDM symbols, the frequency domain pattern changes according to a time domain hopping pattern. Advantageously, the time domain hopping patterns are defined to allow only a certain amount of overlap, for example for only one DFT-S-OFDM symbol, between any two time domain hopping patterns. This functions to reduce the effect of a collision, when two transmitters use the same frequency pattern, they will do so only for part of the overall transmission. Optionally, frequency domain spectral spreading is used in the transmitter. This can further reduce the PAPR. In the receiver, successive interference cancellation may be employed to reduce the effect of colliding transmissions.

20 Claims, 7 Drawing Sheets

MODULATION SCHEME IN A WIRELESS COMMUNICATION SYSTEM

FIELD

The application relates generally to wireless communication, and more specifically to systems and methods that use a DFT-S-OFDM modulation scheme, for example multiple access systems.

BACKGROUND

Non-Orthogonal Multiple Access (NoMA) is mainly intended for massive machine-type communications (mMTC). For mMTC devices, low peak-to-average power ratio (PAPR) waveform is desirable. However, many proposals for NoMA assume an orthogonal frequency division multiplexed (OFDM) waveform, which has high PAPR.

Efforts at collision mitigation for such OFDM-based NoMA schemes have focused on frequency domain resource mapping pattern and spreading sequence design.

Compared to some other NoMA schemes, interleave-grid multiple access (IGMA) has two advantages:

It consumes minimum spatial dimension, and hence has the best minimum mean square error (MMSE) interference rejection combining (IRC) performance;

It is applied to an OFDM waveform. While one transmitter's transmission can collide with another's, colliding with some transmissions may have minor impact due to, for example, low correlation in the spatial domain, while colliding with other transmissions may have a more severe impact. For transmissions that experience a severe impact, soft log likelihood ratios (LLRs) derived from severely impacted quadrature amplitude modulation (QAM) symbols can be significantly lower than those from other QAM symbols, but these lower LLRs can still contribute to decoding by a low code rate FEC code.

However, extending IGMA to create a low PAPR waveform is not straight forward.

It is well-known that single-carrier based waveforms have low PAPR compared to OFDM. One example of a single-carrier waveform is discrete Fourier transform-spread-OFDM (DFT-S-OFDM).

However, the effect of frequency domain partial collision upon DFT-S-OFDM is distortion. In other words, any distortion caused by a partial collision will remain in the demodulated signal, and its effect cannot be mitigated by soft LLR weighting. Another way to state this is that per-collision based soft information is lost in DFT-S-OFDM, because unlike in OFDM, a collision in DFT-S-OFDM is not per-QAM symbol based.

SUMMARY

A new single carrier modulation scheme is provided that has some of the advantages of DFT-S-OFDM, namely a low PAPR, while also providing some of the advantages of IGMA due to the introduction of partial collision in the time domain, namely the use of minimum spatial dimension, retaining collision soft information.

DFT-S-OFDM modulation is used, together with a set of frequency domain patterns. For a given transmitter, for a set of DFT-S-OFDM symbols, the frequency domain pattern changes according to a time domain hopping pattern. Advantageously, the time domain hopping patterns are defined to allow only a certain amount of overlap, for example for only one DFT-S-OFDM symbol, between any two time domain hopping patterns. This functions to reduce the effect of a collision, when two transmitters use the same frequency pattern, they will do so only for part of the overall transmission. Optionally, frequency domain spectral spreading is used in the transmitter; this can further reduce the PAPR. In the receiver, successive interference cancellation may be employed to reduce the effect of colliding transmissions.

According to one aspect of the present disclosure, there is provided a method comprising: transmitting a sequence of DFT-S-OFDM symbols, wherein a time domain hopping pattern is used for the sequence of DFT-S-OFDM symbols, the time domain hopping pattern consisting of a sequence of localized frequency domain patterns that includes one localized frequency domain pattern for each DFT-S-OFDM symbol in the sequence of DFT-S-OFDM symbols, wherein each localized frequency domain pattern in the sequence is from a set of possible localized frequency domain patterns.

Optionally, the time domain hopping pattern is selected from among a set of possible time domain hopping patterns.

Optionally, the method further comprises: receiving signalling via higher layer signalling or dynamic signalling indicating the time domain hopping pattern to use.

Optionally, the set of possible time domain hopping patterns is such that as among any two of the possible hopping patterns, there is at most a set maximum number of collisions, a collision occurring when a two time domain hopping patterns have the same localized frequency domain pattern in a same position within the time domain hopping patterns.

Optionally, the method further comprises at least one of: receiving signalling configuring the set of possible localized frequency domain patterns; receiving signalling configuring the set of possible time domain hopping patterns; or receiving signalling indicating which time domain hopping pattern to use.

Optionally, transmitting the sequence of DFT-S-OFDM symbols comprises transmitting frequency domain spectral shaped (FDSS) DFT-S-FDM symbols.

Optionally, for each of at least one pair of localized frequency domain hopping patterns in the set of possible frequency domain hopping patterns, there is a partial overlap between the pair of frequency domain hopping patterns.

Optionally, the sequence of DFT-S-OFDM symbols is used to transmit a forward error correction (FEC) codeword.

According to another aspect of the present disclosure, there is provided a method comprising: receiving a sequence of DFT-S-OFDM symbols, wherein a time domain hopping pattern is used for the sequence of DFT-S-OFDM symbols, the time domain hopping pattern consisting of a sequence of localized frequency domain patterns that includes one localized frequency domain pattern for each DFT-S-OFDM symbol in the sequence of DFT-S-OFDM symbols, wherein each localized frequency domain pattern in the sequence is from a set of possible localized frequency domain patterns.

Optionally, the time domain hopping pattern is selected from among a set of possible time domain hopping patterns.

Optionally, the method further comprises: transmitting signalling via higher layer signalling or dynamic signalling indicating the time domain hopping pattern to use.

Optionally, the set of possible time domain hopping patterns is such that as among any two of the possible hopping patterns, there is at most a set maximum number of collisions, a collision occurring when a two time domain hopping patterns have the same localized frequency domain pattern in a same position within the time domain hopping patterns.

Optionally, receiving the sequence of DFT-S-OFDM symbols comprises receiving frequency domain spectral shaped (FDSS) DFT-S-FDM symbols.

Optionally, for each of at least one pair of localized frequency domain patterns in the set of possible frequency domain patterns, there is a partial overlap between the pair of frequency domain hopping patterns.

Optionally, the method further comprises: performing interference cancellation when one of the localized frequency domain patterns used for the sequence of DFT-S-OFDM symbols is used by another transmitter at a same time.

Optionally, the method further comprises: processing the received sequence of DFT-S-OFDM symbols using a first FDSS pulse shape that omits the partial overlap between the pair of frequency domain hopping patterns; for the purpose interference cancellation, using a second FDSS pulse shape that corresponds with a FDSS pulse shape used to produce said sequence of DFT-S-OFDM symbols.

Optionally, the sequence of DFT-S-OFDM symbols corresponds to a forward error correction (FEC) codeword.

Optionally, the method further comprises: decoding the FEC codeword making use of soft decision information in respect of DFT-S-OFDM symbols received that relate to that FEC codeword.

According to another aspect of the present disclosure, there is provided an apparatus comprising: a processor and memory; the apparatus configured to perform a method comprising transmitting a sequence of DFT-S-OFDM symbols, wherein a time domain hopping pattern is used for the sequence of DFT-S-OFDM symbols, the time domain hopping pattern consisting of a sequence of localized frequency domain patterns that includes one localized frequency domain pattern for each DFT-S-OFDM symbol in the sequence of DFT-S-OFDM symbols, wherein each localized frequency domain pattern in the sequence is from a set of possible localized frequency domain patterns.

Optionally, the apparatus is an electronic device.

According to one aspect of the present disclosure, there is provided an apparatus comprising: a processor and memory; the apparatus configured to perform a method comprising receiving a sequence of DFT-S-OFDM symbols, wherein a time domain hopping pattern is used for the sequence of DFT-S-OFDM symbols, the time domain hopping pattern consisting of a sequence of localized frequency domain patterns that includes one localized frequency domain pattern for each DFT-S-OFDM symbol in the sequence of DFT-S-OFDM symbols, wherein each localized frequency domain pattern in the sequence is from a set of possible localized frequency domain patterns.

Optionally, the apparatus is an electronic device.

BRIEF DESCRIPTION OF THE DRAWINGS

Embodiments of the disclosure will now be described with reference to the attached drawings in which.

DETAILED DESCRIPTION

The operation of the current example embodiments and the structure thereof are discussed in detail below. It should be appreciated, however, that the present disclosure provides many applicable inventive concepts that can be embodied in any of a wide variety of specific contexts. The specific embodiments discussed are merely illustrative of specific structures of the disclosure and ways to operate the disclosure, and do not limit the scope of the present disclosure.

In accordance with an embodiment of the disclosure, a DFT-S-OFDM based system and method are provided that uses a set of localized frequency-domain patterns, in combination with time-domain patterns that allow for inter-user interference mitigation to be achieved via partial collision in the time domain. A localized frequency domain pattern is a specific contiguous block of subcarriers. The main application of these embodiments is transmission from user equipment. A network element, such as a base station or gNB, would have control of its own transmissions so as to avoid collisions. However, more generally, these embodiments can be applied in any transmitter, including network elements and user equipment.

Figure 1:
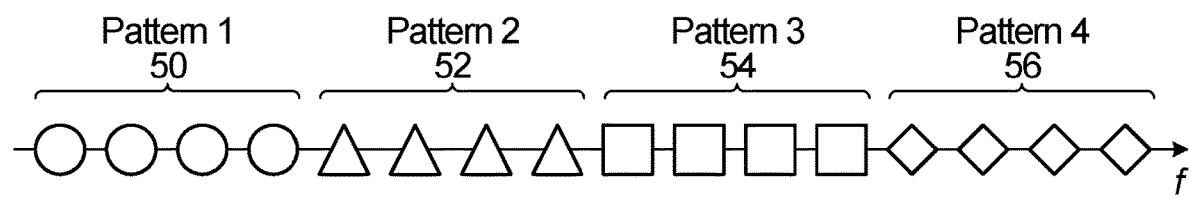
FIG. 1 shows an example of a set of localized frequency domain patterns.

A given transmitter uses one of the frequency-domain patterns within the set to transmit one DFT-S-OFDM symbol. An example of a set of DFT-S-OFDM frequency-domain patterns are shown in FIG. 1, where frequency (more specifically sub-carrier frequency) is along the horizontal dimension. In the illustrated example, there are four patterns 50,52,54,56, and each pattern has 4 subcarriers. Each pattern is localized in the sense that the set of 4 subcarriers included in a given pattern forms a contiguous block of subcarriers. In the example of FIG. 1, there is no overlap in the frequency domain between the patterns; that is to say each subcarrier is only in one pattern. However, in some embodiments, detailed below, there may be an overlap in the frequency domain between adjacent patterns. The example of FIG. 1 is for illustration purposes. The number of subcarriers per pattern and the number of patterns used in a system may vary. In some embodiments, the patterns and the number of patterns are configurable.

For a set of DFT-S-OFDM symbols, for example a set of DFT-S-OFDM symbols associated with a same FEC codeword, a given transmitter transmits the set of DFT-S-OFDM using a sequence of frequency domain patterns from within the set of frequency domain patterns. The frequency domain patterns are used for the set of DFT-S-OFDM transmissions sequentially in the time domain, and therefore the sequence is referred to herein as a time-domain hopping pattern.

Figure 2:
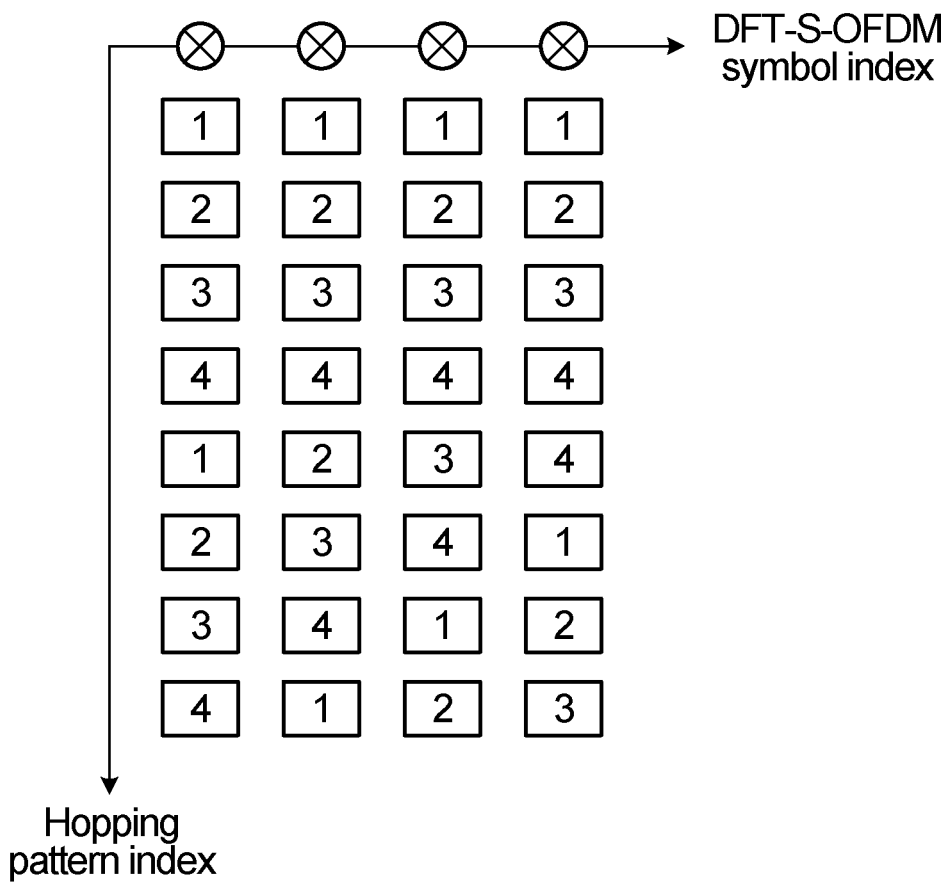
FIG. 2 shows an example of a set of time-domain hopping patterns.

An example of a set of time-domain hopping patterns of frequency domain patterns is shown in FIG. 2. In FIG. 2, each row is a respective time domain hopping pattern. The horizontal dimension is DFT-S-OFDM symbol index (time), so the illustrated example, the hopping patterns are four symbols in duration. Each time-domain hopping pattern indicates which frequency domain pattern to use for each of the four symbols. For example, a transmitter using the pattern in the first row, will transmit DFT-S-OFDM symbols using the first frequency domain pattern for each of four DFT-S-OFDM symbol durations. A transmitter using the pattern in the fifth row, will transmit a DFT-S-OFDM symbol using the first frequency domain pattern for the first DFT-S-OFDM symbol duration, will transmit a DFT-S-OFDM symbol using the second frequency domain pattern for the second DFT-S-OFDM symbol duration, will transmit a DFT-S-OFDM symbol using the third frequency domain pattern for the third DFT-S-OFDM symbol duration, and will transmit a DFT-S-OFDM symbol using the fourth frequency domain pattern for the fourth DFT-S-OFDM symbol duration.

The transmissions of different transmitters are aligned in the sense that start times for beginning a new time domain hopping pattern are aligned. There is no partial overlap in the time domain; either there is a complete overlap or no overlap.

The time-domain hopping patterns are designed such that for any two patterns that are used at the same time, there is a limited number of collisions between the frequency domain patterns of any two time domain hopping patterns, for example a maximum of one collision. A collision occurs when the same frequency domain pattern is used at the same time in two time domain hopping patterns. For example, with reference to the example time domain hopping patterns depicted in FIG. 2, assume a transmitter is using 5th row to make a transmission; the transmission will collide with a transmission made by another transmitter using the 1st row on the 1st DFT-S-OFDM symbol, with a transmission made by a transmitter using the 2nd row on the 2nd DFT-S-OFDM symbol, and so on, but it will not collide with the same time domain hopping pattern more than once.

The example of FIG. 2 is for illustration purpose. The number and length of time domain hopping patterns used in a system may vary, and of course, the time domain hopping patterns themselves may be differently defined. In some embodiments, the length and/or time domain hopping patterns and the number of time domain hopping patterns are configurable and/or the time domain hopping patterns themselves are configurable. While in the example of FIG. 2, two time domain hopping patterns are allowed to overlap in at most one frequency domain pattern, in another embodiment, more generally the set of possible time domain hopping patterns is such that as among any two of the possible time domain hopping patterns, there is at most a set maximum number of collisions, a collision occurring when two time domain hopping patterns have the same localized frequency domain pattern in a same position within the time domain hopping patterns.

In summary, when a sequence of DFT-S-OFDM symbols is transmitted by a user equipment using one of the time-domain hopping patterns, the sequence only partially collides the transmissions of any other specific user, as shown in FIG. 2.

In the example of FIG. 1, there is no overlap between adjacent frequency domain patterns. In some embodiments frequency domain spectral shaping (FDSS) is applied in the transmitter. In such cases, optionally, to improve spectrum efficiency, frequency domain patterns can be defined and used that partially overlap between at least some of the adjacent frequency domain patterns. An example of overlapping frequency domain hopping patterns, after spectral shaping, is shown in FIG. 3.

Figure 3:
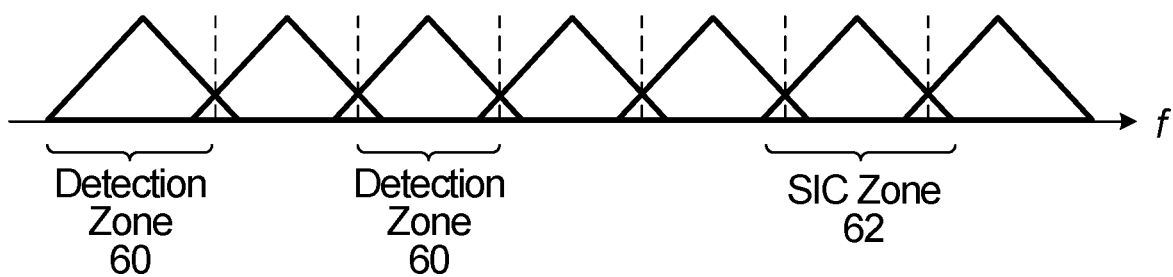
FIG. 3 shows an example of a set of localized frequency domain patterns with partial overlap between adjacent patterns, and with applied frequency domain spectral shaping.

FIG. 3 shows an example of using 33% bandwidth expansion to accommodate a roll-off factor $\alpha=1$ RRC (root-raised-cosine) pulse (for simplicity, a triangle spectrum shape is used for the illustration purpose)

In the receiver, LLRs (log-likelihood ratios) from QAM symbols carried by a corrupted DFT-S-OFDM symbol (one for which there is a collision, or one that is otherwise caused to be corrupt at the receiver) can be properly weighted, and therefore no soft information is lost.

When overlapping frequency domain patterns are used with FDSS in the transmitters, as described above with reference to FIG. 3, at a receiver, a detection zone and SIC (successive interference cancellation) zone can be defined differently. An example is shown in FIG. 3, where a detection zone 60 is defined that is narrower than the full FDSS pulse shape, and an SIC zone 62 is defined that encompasses the full FDSS pulse shape.

Figure 4:
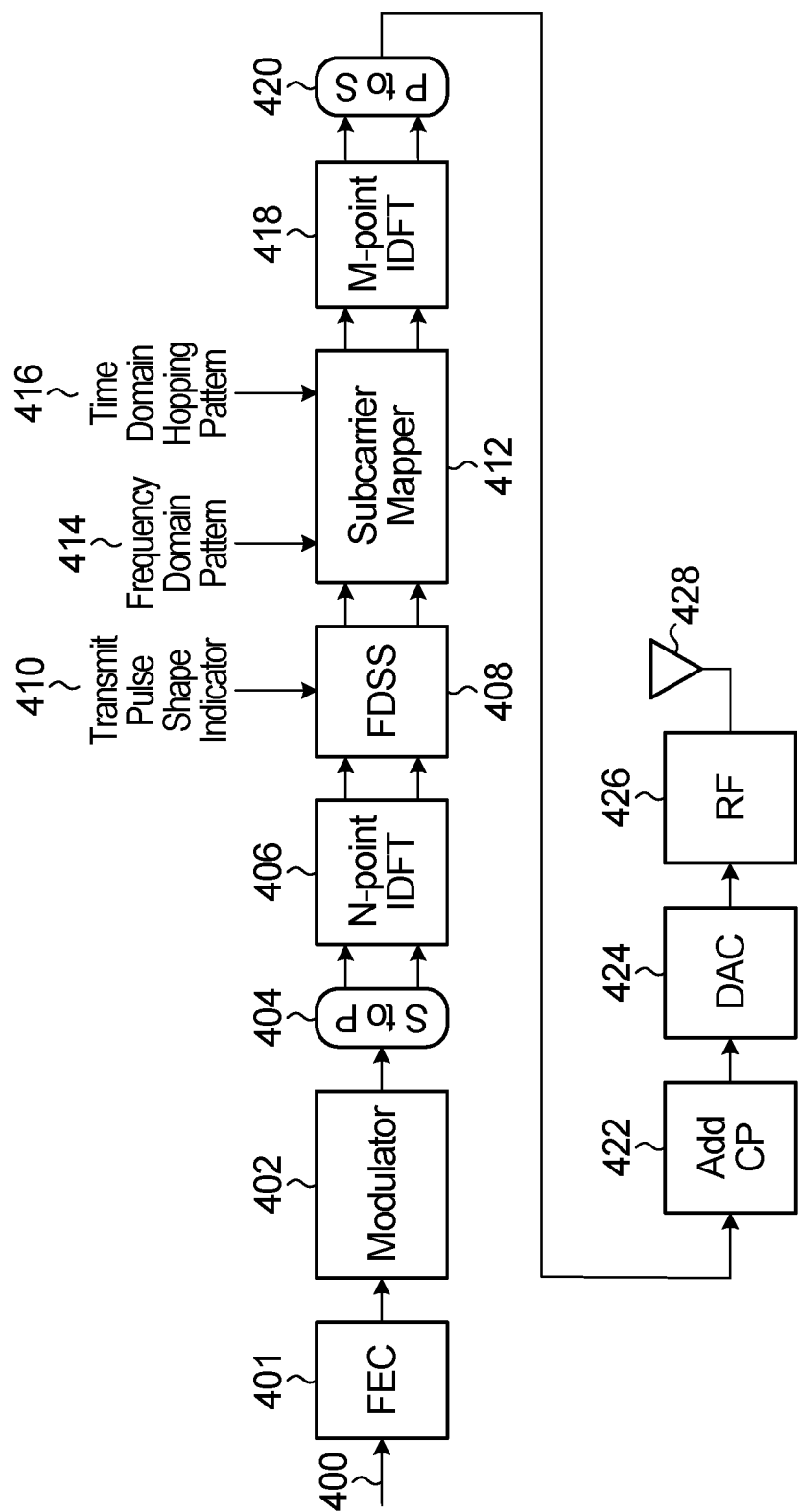
FIG. 4 is a block diagram of a transmitter provided by an embodiment of the disclosure.

Referring how to FIG. 4, shown is a block diagram of a transmit side functionality for a system implementing DFT-S-OFDM, with time domain hopping pattern in accordance with an embodiment of the application. Transmit side functionality includes a forward error correction (FEC) encoder 401, modulator 402, serial-to-parallel converter 404, N-point DFT 406, FDSS 408, subcarrier mapper 412, M-point IDT 418, parallel to serial converter 420, an add cyclic prefix (CP) block 422, and additional functionality including digital to analog (DAC) converter 424, RF block 426 and antenna 428. Inputs include a set of input bits 400 to be transmitted, a transmit pulse shape indicator 410, frequency domain patterns 414, and time domain hopping pattern 416.

In operation, a set of input bits is encoded with FEC encoder 401 which obtains a FEC codeword containing FEC encoded bits. The FEC encoded bits are modulated by modulator 402 to obtain K×N modulated symbols, where K is the length of the time domain patterns implemented in the subcarrier mapper 412, and N is the number of modulated symbols carried by one DFT-S-OFDM symbol. Where fewer than K×N modulated symbols are produced, padding can be added to give a total of K×N modulated symbols. The modulated symbols are input to the serial to parallel converter 404, N at a time. The output of the serial to parallel converter is processed by the N-point DFT 406 to produce a frequency domain signal. This signal is processed by FDSS 408 to produce a pulse shaped frequency domain signal. The pulse shape applied by the FDSS 408 may be fixed, or set in accordance with a transmit pulse shape indicator 410. The output of FDSS 108 is input to a subcarrier mapper 412 which maps the N outputs of the FDSS block to a localized set of N inputs to the M-point IDFT 418. The operation of the mapper is described in further detail below. The M-point IDFT which converts the frequency domain signal back to M samples of a time domain signal. The M samples are converted to serial form with parallel to serial converter 420. A cyclic prefix is added at 422. Digital to analog conversion takes place in the DAC 424, and RF block 426 processes the analog signal to produce an RF signal for transmission on the antenna 428.

Returning now to the sub-carrier mapper 412, the set of inputs to the M-point IDFT 418 mapped to during a given symbol duration is one of an available set of localized frequency domain patterns. In some embodiments, the set of available frequency domain patterns is fixed in the subcarrier mapper 412; alternatively, these are configured with frequency domain patterns input 414 that specifies the available frequency domain patterns, as shown in FIG. 4. For each frequency domain pattern, this may have the form of a range of subcarriers included in the frequency domain pattern, and index for the pattern.

The frequency domain patterns are localized in the sense that each pattern includes a contiguous set of subcarriers; the subcarriers are not spread out. In some embodiments, there is no overlap in frequency between adjacent frequency domain patterns, and no gap between adjacent patterns. For example, if N is 10, and M is 100, then 10 non overlapping frequency domain patterns can be defined. The first frequency domain pattern including the first 10 inputs to the M-IDFT; the second frequency domain pattern including the second 10 inputs, and so on.

In some embodiments, as described previously, there is some overlap in frequency between adjacent frequency domain patterns, and no gap between adjacent frequency domain patterns. For example, if N is 10, and M is 100, then a set of frequency domain patterns that overlap adjacent frequency domain patterns by one subcarrier can be defined. The first frequency domain pattern including the first 10 inputs to the M-IDFT; the second frequency domain pattern including inputs 9 to 18; the third frequency domain pattern including inputs 17 to 26.

FIG. 1 described above provided another example of non-overlapping frequency domain patterns each containing 4 subcarriers in a system with a total of 4 frequency domain patterns. More generally, the number of subcarriers per frequency domain pattern and the number of frequency domain patterns a system can have can be configured.

Referring again to FIG. 4, the sub-carrier mapper 412 also functions based on the time-domain hopping pattern indicator input 416. This time-domain hopping pattern indicator input 416 indicates an order, in the time domain, that frequency domain patterns from the available set of frequency domain patterns will be applied. The length of the time domain hopping pattern is K. Referring again to FIG. 2, shown is a set of time domain hopping patterns of length 4. For each DFT-S-OFDM symbol duration, an output of the subcarrier mapper is input to the M-point IDFT 418 which convert the signal back to the time domain. Parallel to serial converter 420 converts the parallel set of samples to a serial stream, and then a cyclic prefix is added by add CP block 422. The signal is converted to analog form with DAC 424, RF processed in RF block 426, and transmitted by the antenna 428.

Figure 5:
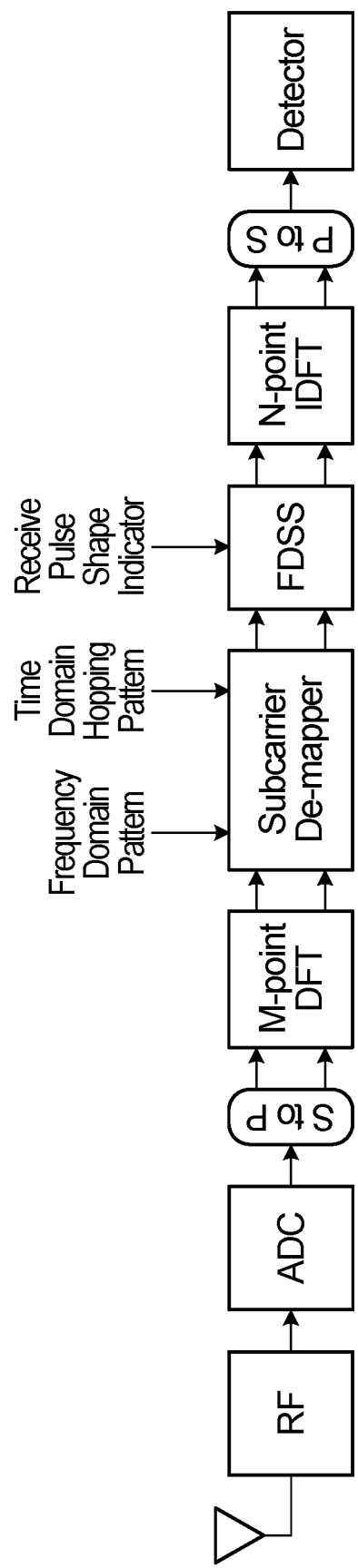
FIG. 5 is a block diagram of a transmitter provided by an embodiment of the disclosure.

Referring how to FIG. 5, shown is a block diagram of a receive side functionality for a system implementing DFT-S-OFDM, with time domain pattern hopping in accordance with an embodiment of the application. The functionality is basically the reverse of that shown in FIG. 4.

In some embodiments, the receiver performs successive interference cancellation (SIC). SIC takes place in the frequency domain, because channel estimation is done in the frequency domain. The SIC procedure may for example involve the following steps:

Step-1: The receiver detects each user's signal independently (in a parallel or serial way);

Step-2: Re-encode and modulate (e.g. QAM) the correctly decoded signal;

Step-3: Do DFT-spreading to get the corresponding frequency domain signal;

Step-4: Multiply the reconstructed frequency domain signal with its corresponding estimated channel;

Step-5: Subtract the Step-4 reconstructed signal from the received signal (this is the SIC step);

Repeat Step-1 to Step-5, until all signals are successfully decoded. Signalling

In some embodiments, the network transmits, and the UE receives signaling of one or more parameters to set up a framework for the provided DFT-S-OFDM transmission method that may include one or more of:

a definition of a set of localized frequency domain patterns: each frequency domain pattern may be a localized frequency band or a set of contiguous resource blocks, for example;

a definition of a set of time domain hopping patterns;

a definition of a bandwidth part or frequency band, in which case localized frequency domain patterns are defined relative to the bandwidth part or frequency band.

In some embodiments, the signaling to set up the framework may be transmitted using higher layer signaling, such as UE-specific RRC signaling, or higher layer signaling that is not UE-specific. Alternatively, one or more of these parameters may be predefined/preconfigured, in which case they do not need to be signaled.

In some embodiments, the network transmits, and the UE receives signaling of one or more parameters that include an indication of which time domain hopping pattern to use as among a previously defined/previously signaled/previously configured/preconfigured set of time domain hopping patterns. Alternatively, the network may transmit signalling that indicates a definition of a single time domain hopping pattern that the UE is to use. In this case, the UE is only aware of its own time domain hopping pattern.

In some embodiments, the signaling of which time domain hopping pattern to use is transmitted using high layer signaling (for example UE specific RRC signaling). In some embodiments, this is applied to dynamic grant based transmission or configured grant transmission.

In some embodiments, the signaling of which time domain hopping pattern to use is transmitted using dynamic signaling, for example downlink control information (DCI). In some embodiments, dynamic signaling is applied for dynamic grant based transmission.

Figure 6:
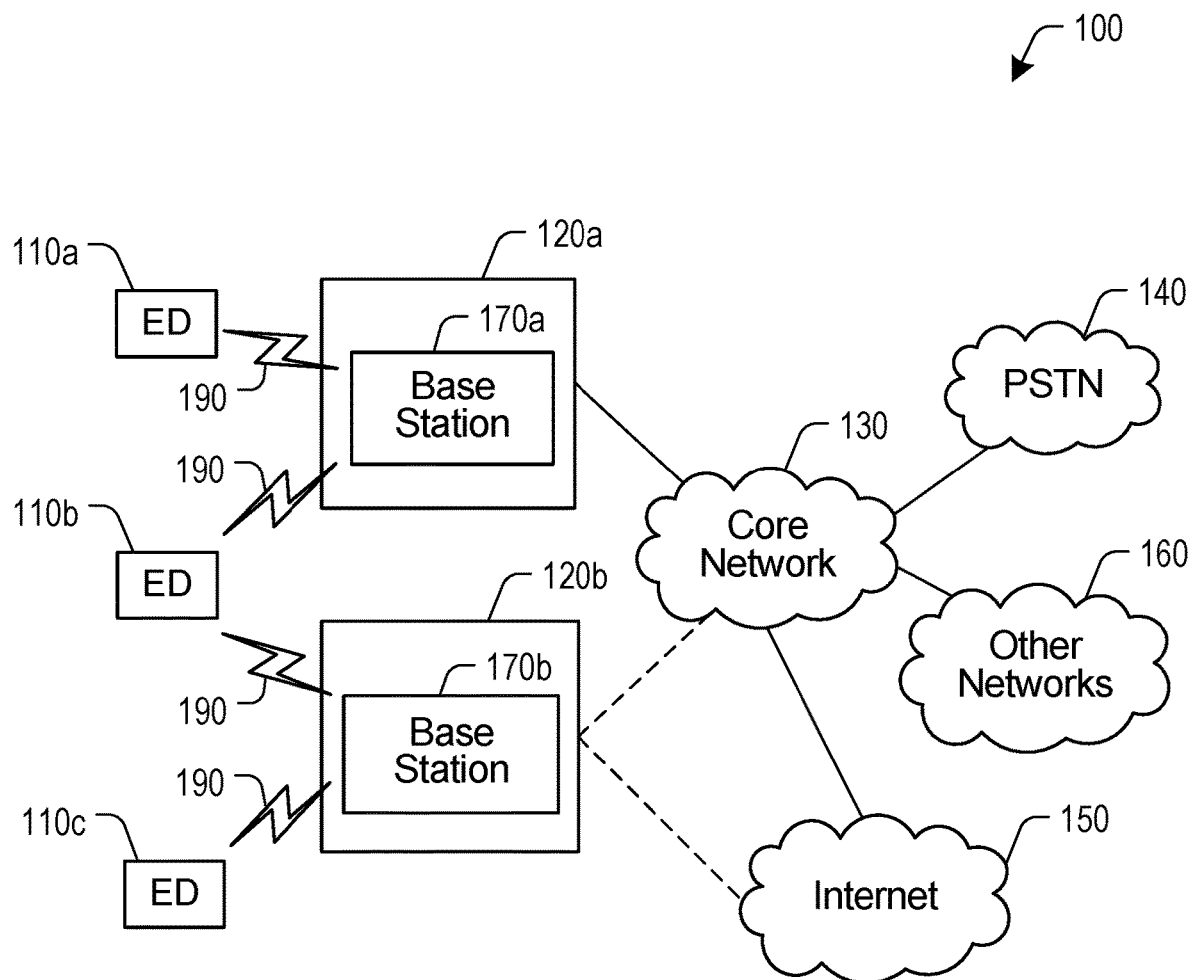
FIG. 6 shows an example of a network for implementing one or more embodiments of the disclosure.

FIG. 6 illustrates an example communication system 100 in which embodiments of the present disclosure may be implemented. In general, the communication system 100 enables multiple wireless or wired elements to communicate data and other content. The purpose of the communication system 100 may be to provide content (voice, data, video, text) via broadcast, narrowcast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 6, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 6, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown. The detailed embodiments described herein make reference to TPs, but more generally, any type of base station can be used for any of the embodiments described herein.

The EDs 110a-110c and base stations 170a-170b are examples of communication equipment that can be configured to implement some or all of the functionality and/or embodiments described herein. In the embodiment shown in FIG. 6, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, LTE-B and/or New Radio (NR). It is contemplated that the communication system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such.

Figure 7A:
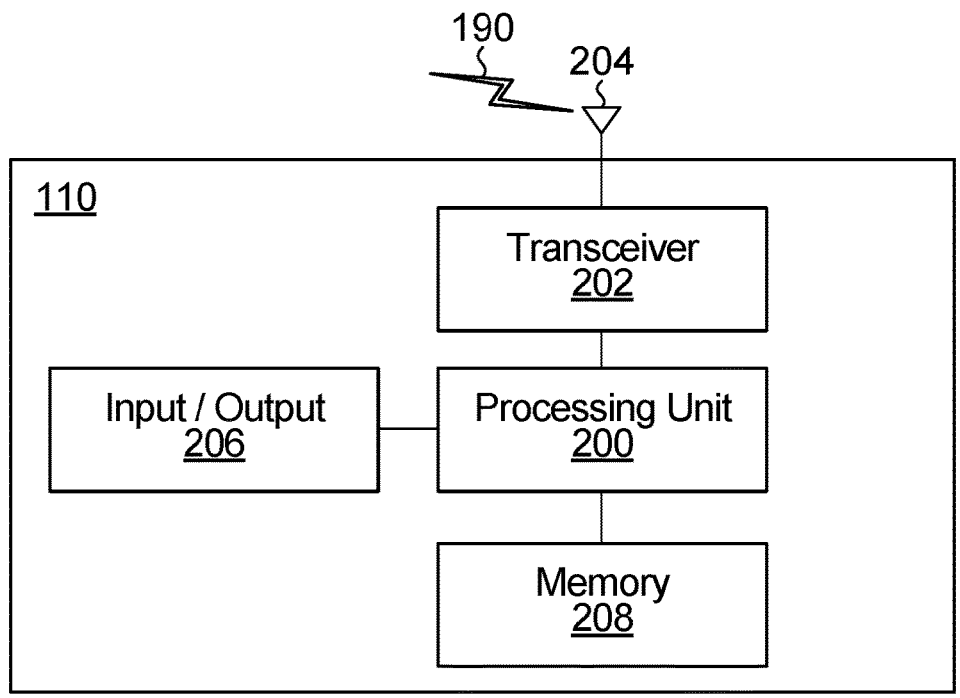
FIG. 7A is a block diagram of an example electronic device.
Figure 7B:
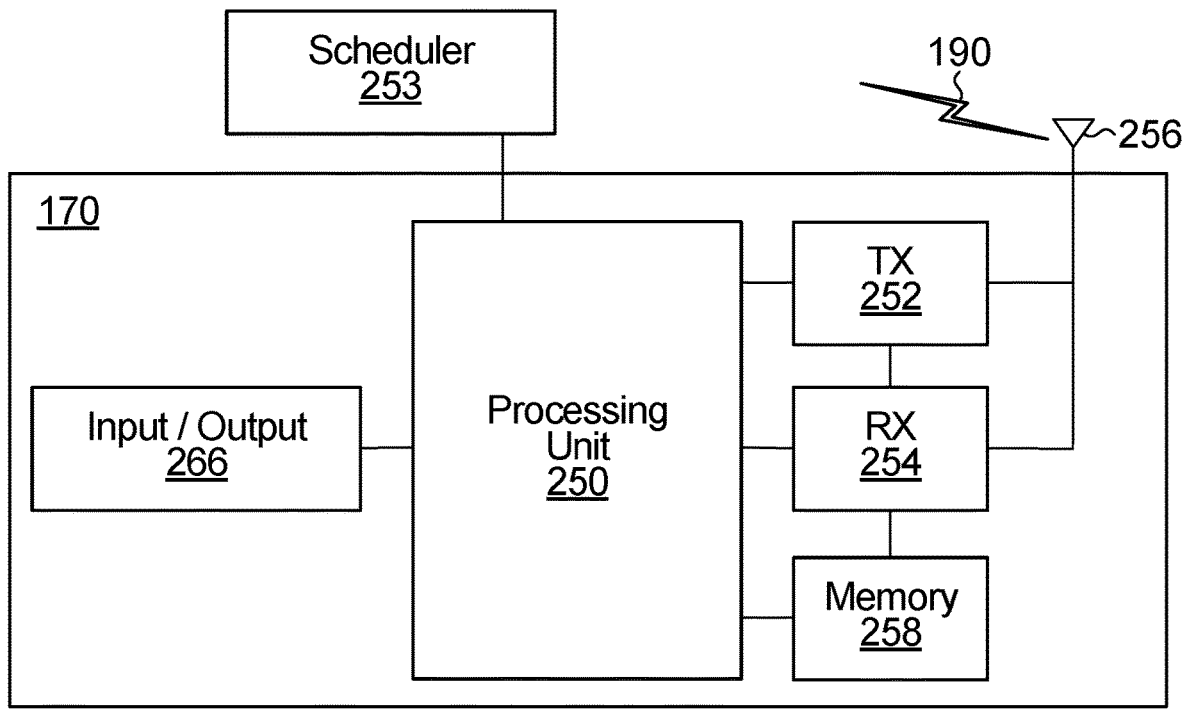
FIG. 7B is a block diagram of an example electronic device.

FIG. 7A and FIG. 7B illustrate example devices that may implement the methods and teachings according to this disclosure. In particular, FIG. 7A illustrates an example ED 110, and FIG. 7B illustrates an example base station 170. These components could be used in the communication system 100 or in any other suitable system. For example, the ED of FIG. 7A may implement the functionality of FIG. 4 and/or that of FIG. 5. The base station of FIG. 7B may implement the functionality of FIG. 4 and/or that of FIG. 5.

As shown in FIG. 7A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 7B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Additional details regarding the EDs 110 and the base stations 170 are known to those of skill in the art. As such, these details are omitted here for clarity.

Numerous modifications and variations of the present disclosure are possible in light of the above teachings. It is therefore to be understood that within the scope of the appended claims, the disclosure may be practiced otherwise than as specifically described herein.

The invention claimed is:

1. A method comprising:
   transmitting a sequence of DFT-S-OFDM symbols, wherein a time domain hopping pattern is used for the sequence of DFT-S-OFDM symbols, the time domain hopping pattern consisting of a sequence of localized frequency domain patterns that includes one localized frequency domain pattern for each DFT-S-OFDM symbol in the sequence of DFT-S-OFDM symbols, wherein each localized frequency domain pattern in the sequence is from a set of possible localized frequency domain patterns.

2. The method of claim 1 wherein the time domain hopping pattern is selected from among a set of possible time domain hopping patterns.

3. The method of claim 2 wherein the set of possible time domain hopping patterns is such that as among any two of the possible hopping patterns, there is at most a set maximum number of collisions, a collision occurring when a two time domain hopping patterns have the same localized frequency domain pattern in a same position within the time domain hopping patterns.

4. The method of claim 2 further comprising at least one of:
   receiving signalling configuring the set of possible localized frequency domain patterns;
   receiving signalling configuring the set of possible time domain hopping patterns; or
   receiving signalling indicating which time domain hopping pattern to use.

5. The method of claim 1 further comprising:
   receiving signalling via higher layer signalling or dynamic signalling indicating the time domain hopping pattern to use.

6. The method of claim 1 wherein transmitting the sequence of DFT-S-OFDM symbols comprises transmitting frequency domain spectral shaped (FDSS) DFT-S-FDM symbols.

7. The method of claim 1 wherein for each of at least one pair of localized frequency domain hopping patterns in the set of possible frequency domain hopping patterns, there is a partial overlap between the pair of frequency domain hopping patterns.

8. The method of claim 1 wherein the sequence of DFT-S-OFDM symbols is used to transmit a forward error correction (FEC) codeword.

9. A method comprising:
   receiving a sequence of DFT-S-OFDM symbols, wherein a time domain hopping pattern is used for the sequence of DFT-S-OFDM symbols, the time domain hopping pattern consisting of a sequence of localized frequency domain patterns that includes one localized frequency domain pattern for each DFT-S-OFDM symbol in the sequence of DFT-S-OFDM symbols, wherein each localized frequency domain pattern in the sequence is from a set of possible localized frequency domain patterns.

10. The method of claim 9 wherein the time domain hopping pattern is selected from among a set of possible time domain hopping patterns.

11. The method of claim 10 wherein the set of possible time domain hopping patterns is such that as among any two of the possible hopping patterns, there is at most a set maximum number of collisions, a collision occurring when a two time domain hopping patterns have the same localized frequency domain pattern in a same position within the time domain hopping patterns.

12. The method of claim 9 further comprising:
transmitting signalling via higher layer signalling or dynamic signalling indicating the time domain hopping pattern to use.

13. The method of claim 9 wherein receiving the sequence of DFT-S-OFDM symbols comprises receiving frequency domain spectral shaped (FDSS) DFT-S-FDM symbols.

14. The method of claim 9 wherein for each of at least one pair of localized frequency domain patterns in the set of possible frequency domain patterns, there is a partial overlap between the pair of frequency domain hopping patterns.

15. The method of claim 14 further comprising:
performing interference cancellation when one of the localized frequency domain patterns used for the sequence of DFT-S-OFDM symbols is used by another transmitter at a same time.

16. The method of claim 15 further comprising:
processing the received sequence of DFT-S-OFDM symbols using a first FDSS pulse shape that omits the partial overlap between the pair of frequency domain hopping patterns;
for the purpose interference cancellation, using a second FDSS pulse shape that corresponds with a FDSS pulse shape used to produce said sequence of DFT-S-OFDM symbols.

17. The method of claim 9 wherein the sequence of DFT-S-OFDM symbols corresponds to a forward error correction (FEC) codeword.

18. The method of claim 17 further comprising:
decoding the FEC codeword making use of soft decision information in respect of DFT-S-OFDM symbols received that relate to that FEC codeword.

19. An apparatus comprising:
a processor and memory;
the apparatus configured to perform a method comprising
transmitting a sequence of DFT-S-OFDM symbols, wherein a time domain hopping pattern is used for the sequence of DFT-S-OFDM symbols, the time domain hopping pattern consisting of a sequence of localized frequency domain patterns that includes one localized frequency domain pattern for each DFT-S-OFDM symbol in the sequence of DFT-S-OFDM symbols, wherein each localized frequency domain pattern in the sequence is from a set of possible localized frequency domain patterns.

20. An apparatus comprising:
a processor and memory;
the apparatus configured to perform a method comprising
receiving a sequence of DFT-S-OFDM symbols, wherein a time domain hopping pattern is used for the sequence of DFT-S-OFDM symbols, the time domain hopping pattern consisting of a sequence of localized frequency domain patterns that includes one localized frequency domain pattern for each DFT-S-OFDM symbol in the sequence of DFT-S-OFDM symbols, wherein each localized frequency domain pattern in the sequence is from a set of possible localized frequency domain patterns.

* * * * *